United States Patent
Shavell et al.

(10) Patent No.: US 9,749,446 B1
(45) Date of Patent: Aug. 29, 2017

(54) METHOD FOR CONSOLIDATED ENVIRONMENT COMPUTING

(71) Applicant: Symantec Corporation, Mountain View, CA (US)

(72) Inventors: Michael Shavell, Merrimack, NH (US); Andrew Chang, Pelham, NH (US); Ashok Vengala, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 228 days.

(21) Appl. No.: 14/659,402

(22) Filed: Mar. 16, 2015

(51) Int. Cl.
*H04L 29/06* (2006.01)
*H04L 12/24* (2006.01)

(52) U.S. Cl.
CPC .......... *H04L 67/42* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 2008/0080396 A1* | 4/2008 | Meijer | H04L 12/66 370/254 |
| 2008/0080552 A1* | 4/2008 | Gates | H04L 12/66 370/468 |
| 2010/0131948 A1* | 5/2010 | Ferris | G06F 9/50 718/1 |
| 2015/0046922 A1* | 2/2015 | Allen | G06F 9/45558 718/1 |
| 2015/0229645 A1* | 8/2015 | Keith | H04L 41/50 726/4 |
| 2016/0164797 A1* | 6/2016 | Reque | G06F 9/445 718/1 |

* cited by examiner

*Primary Examiner* — Natisha Cox
(74) *Attorney, Agent, or Firm* — Maschoff Brennan

(57) ABSTRACT

A method of dynamically servicing a client request is provided. A consolidated computing environment receives a client request at a single front end service. Desired environment parameters, including usage parameter information are parsed from the request. Resources are allocated in accordance with this usage parameter information, and the allocated computing resources cooperate to create a virtual environment. The client request is executed in this virtual environment.

20 Claims, 4 Drawing Sheets

METHOD FOR CONSOLIDATED ENVIRONMENT COMPUTING

BACKGROUND

Distributed computing services are an increasingly important part of computing systems. Development of these distributed computing services has required maintaining multiple environments of these services in various stages of testing and production. Clients wishing to access these services are directed to these distinct and fixed environments depending on the client's needs. Each environment has historically required a dedicated machine, virtual machine, or cluster to host the environment. Clients have been directed to a specific server stack within these clusters through load balancers that merely direct the client to a specific environment. Maintaining these distinct environments results in a large number of under-utilized resources as well as unnecessary redundancy between the distinct environments. The costs associated with maintaining these under-utilized and redundant environments are significant.

It is within this context that the embodiments arise.

SUMMARY

The embodiments reduce the number of under-utilized resources and reduce redundancy that exists with multiple distinct computing environments by consolidating multiple computing environments into a single computing environment that is capable of dynamically servicing back-end services and dependencies for multiple virtual environments.

A method and system are described for achieving consolidation of computing environments. The embodiments disclose a dynamically configurable consolidated computing environment that is capable of servicing clients from a single front end service.

In one embodiment, a consolidated computing environment receives a client request at a single front end service. Desired environment parameters, including usage parameter information are parsed from the request. Resources are allocated in accordance with this usage parameter information, and the allocated computing resources cooperate to create a virtual environment. The client request is executed in this virtual environment.

In another embodiment, the consolidated computing environment receives multiple client requests. The consolidated computing environment has access to resources specific to each request. The resources may be internal to the consolidated computing environment, or the resources may be external to the consolidated computing environment. Usage parameter information is parsed from the multiple client requests. The consolidated computing environment creates an environment specific to each client request by allocating resources of the consolidated computing environment according to the individual client requests. The client requests are executed in their respective allocated environments.

In yet another embodiment, a parser is configured to extract environment information form a received client request. An allocator is configured to receive the environment information and allocate back-end resources of a consolidated computing environment. The allocated resources cooperate for form a virtual environment specific to the client request. The client request is executed in the virtual environment.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
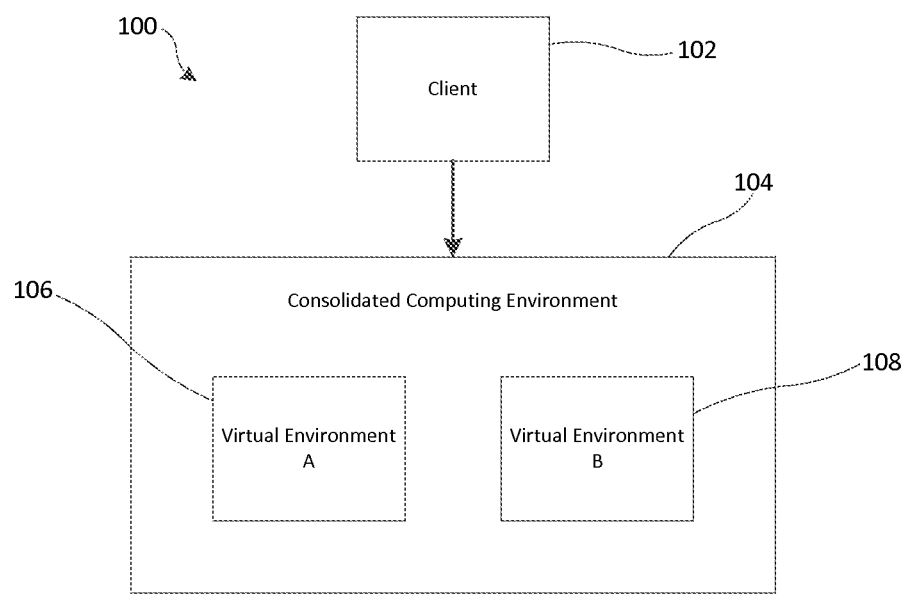
FIG. 1 shows a block diagram depicting a consolidated computing environment receiving a client request.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments provide a consolidated computing environment that dynamically allocates resources according to a client request. In a particular embodiment the consolidated computing environment may include two or more environments that share resources. Upon receiving a request from a client, usage parameter information may be extracted from the request. The consolidated computing environment may then use this usage parameter information to allocate resources within the consolidated computing environment. These resources may include a processor, an operating system having a file system, databases, storage, applications and other components associated with a computing environment. The allocated resources may act as a distinct environment during the execution of the request.

The usage parameter information may be contained in a Uniform Resource Locator (URL). By detecting an incoming hostname, usage parameter information may be parsed out from the URL. For example, a consolidated computing environment that includes a beta environment and a production environment within the consolidated computing environment may receive a client request directed to beta.norton.com. The consolidated computing environment may allocate resources both within the environment and external to the environment such that the execution of the request behaves as if the execution occurred within the beta environment. The embodiments enable pre-production test/development/integration environments to be collapsed into one consolidated environment. Consequently, instead of maintaining disparate, extant environments, such as the example environments of the assignee of: bat.o2.norton.com, bat2.o2.norton.com, cos_int.o2.norton.com, cos_int2.o2.norton.com, ext_int.o2.norton.com, stage.o2.norton.com, etc., the embodiments described below provide one environment that handles all these configurations, with no changes necessary from the integrating teams.

The usage parameter information may be parsed from the client request within the consolidated computing environment in some embodiments. Alternatively, the request may be directed to the consolidated computing environment, where a controller may parse the usage parameter information from the client request. The controller may interpret the usage parameter information, and allocate resources responsive to the client request. These and other embodiments are discussed below with reference to FIGS. 1-4. However, those skilled in the art will readily appreciate that the detailed description given herein with respect to these Figures is for explanatory purposes only and should not be construed as limiting.

FIG. 1 shows a block diagram 100 depicting a consolidated computing environment 104 receiving a request from a client 102. In one embodiment, the consolidated computing environment 104 may receive a request from a client 102 that is a remote computer accessing the consolidated computing environment 104 over the Internet. In another embodiment, the consolidated computing environment 104 may receive a request from a client 102 across a local area network or a request from a client 102 that is within the consolidated computing environment 104. The consolidated computing environment may receive the request through any suitable data connection such as a network port. In one embodiment, the consolidated computing environment may receive the request from the client over an Ethernet connection that connects the consolidated computing environment to the world wide web. In another embodiment, the request may be made over a suitable data connection including USB™, Firewire™, Thunderbolt™, etc.

The consolidated computing environment 104 can be located on a server accessible over a network. The server may include both hardware and software suitable for receiving requests and executing the requests. The server hardware may include a processor, I/O connections, and storage. The software may include an operating system, a file system associated with the operating system, databases, and applications. In one embodiment, the consolidated computing environment 104 is capable of simulating two distinct environments, virtual environment A 106, and virtual environment B 108. Upon receiving a request from a client, the consolidated computing environment 104 may execute the request in one of the simulated environments, virtual environment A or virtual environment B. In another embodiment, the consolidated computing environment 104 is capable of executing the request in one of a plurality of simulated environments. The consolidated computing environment 104 may execute the client request in one virtual environment, while accessing resources associated with another virtual environment that is contained within the consolidated computing environment 104 or accessible by the consolidated computing environment 104. The consolidated computing environment 104 can simultaneously support two or more virtual environments, each responsive to a client request directed to that respective environment.

A resource used in a first virtual environment may be used simultaneously or subsequently in a second virtual environment accessible to the consolidated computing environment 104. Resources may be internal to the consolidated computing environment 104, or may be external to the consolidated computing environment. Internal resources may include software resources such as an operating system(s), a file system, applications, and databases; and hardware resources such as storage, system memory, processing, and network connections and/or virtual networks, each as appropriate for the client request. External resources may include servers their attendant software and hardware resources that are accessible to the consolidated computing environment 104. It should be appreciated that the computing environments represented by virtual environment A 106 and virtual environment B 108 may be any suitable computing environment, such as one or more testing environments and/or one or more production environments. In addition, the computing environments within consolidated computing environment 104 may appear to a client as distinct computing environments, e.g., as a production environment and a test environment.

Figure 2:
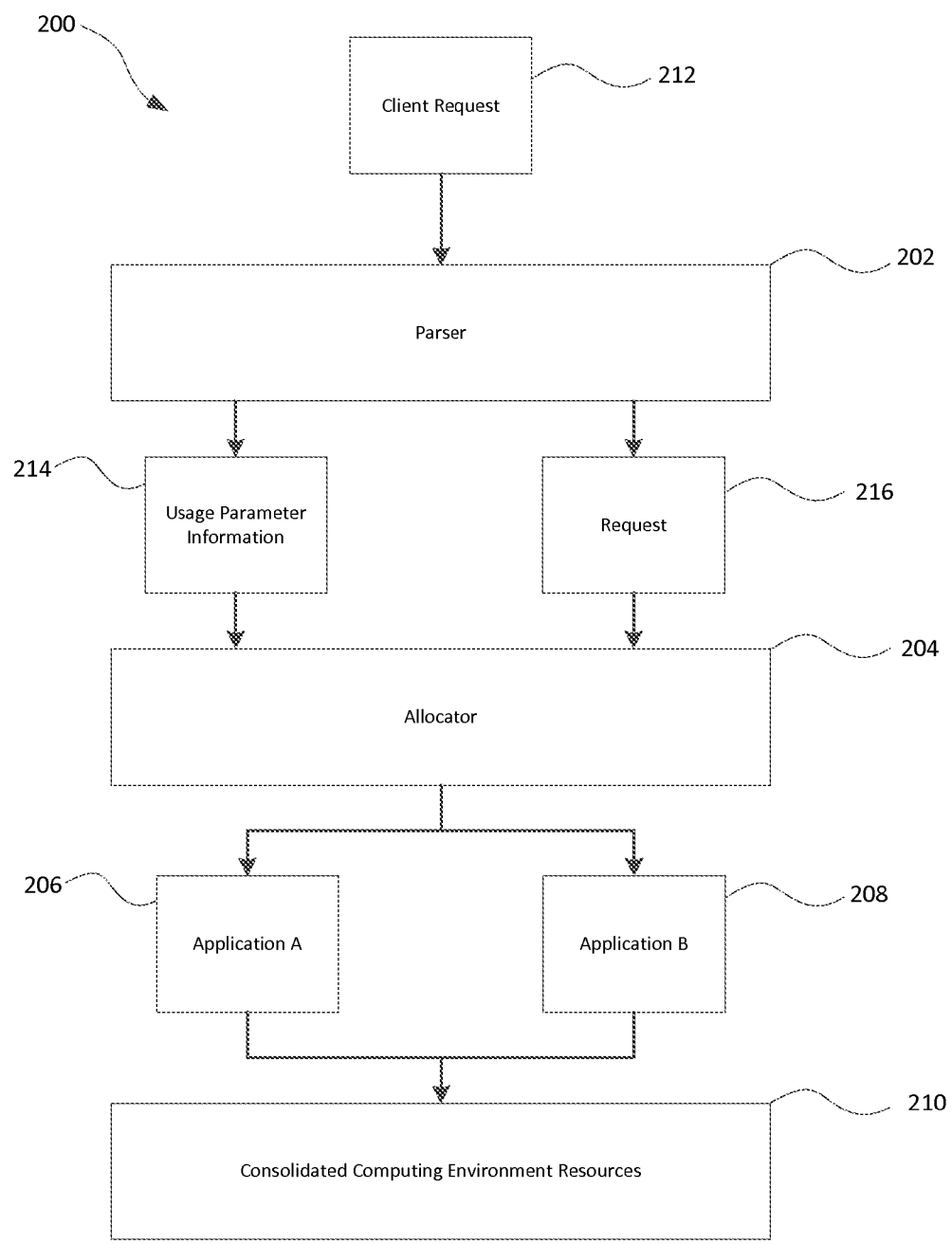
FIG. 2 shows a block diagram depicting a consolidated computing environment allocating resources accessible to the consolidated computing environment.

FIG. 2 illustrates a block diagram 200 depicting a consolidated computing environment allocating resources that are accessible to the consolidated computing environment. The system depicted in FIG. 2 receives a client request 212 and determines and allocates an appropriate virtual environment using resources from the consolidated computing environment resources 210. In one embodiment, a parser 202 exists within the consolidated computing environment and parses environment information from a client request 212. The environment information may include usage parameter information 214 and the request 216. In another embodiment, the parser 202 exists outside the consolidated computing environment, and passes both the request 216 and the parsed usage parameter information 214 into the consolidated computing environment.

The parser 202 receives the client request 212 and extracts environment information from the client request 212. In one embodiment the parser 202 may extract usage parameter information 214 from a header such as an X-SYMC-Environment: COS-INT2. Other types of hypertext transfer protocol (HTTP) headers and types of environment information embedded in HTTP headers are readily devised in keeping with the teachings herein. In another embodiment, the parser 202 may detect an incoming Virtual Internet Protocol (VIP) hostname and parse out the leading environment information. For example o2-int2.norton.com would resolve to the INT2 environment. Continuing with this example, the system would utilize resources such as SSO, COLP, Single Point of Contact (SPOC), from the consolidated computing environment resources 210, on the INT2 environment. In further embodiments, a uniform resource identifier (URI) or a uniform resource locator (URL) may be parsed by the parser 202 to provide the environment information.

The parser 202 passes the environment information to the allocator 204 in the form of the usage parameter information 214 and the request 216. The usage parameter information 214 may include information about the desired environment, information about the request itself, and/or any further parameters that need to be passed to the consolidated computing environment. More specifically these parameters will be passed to a virtual environment that is created by allocating resources of the consolidated computing environment such as application A 206, application B 208, and the consolidated computing resources 210.

The allocator 204 may receive a request 216 and usage parameter information 214 from the parser 202. The allocator 204 assigns resources of the consolidated computing environment and routes the request to the correct back end services. These resources can include applications 206 and 208, or these applications could be considered separately in some embodiments. Whichever of these is the case, the allocator 204 assigns an application determined in accordance with the request. In some embodiments the allocator may allocate resources both internal and external to the consolidated computing environment. Once the request is correctly routed, the allocated virtual environment executes the request. Among other tasks, the allocator 204 could configure a URL, a server name, parameters, e.g., for an application, and HTTP headers. In this manner, methods of access to a virtual environment will be transparent to endpoints including clients utilizing the consolidated computing environment. Parser 202 and allocator 204 may be embodied as hardware, software, firmware, or some combination of these. For example, the parser 202 and allocator 204 may be integrated into an appliance and executed through application specific integrated circuits or some other suitable programmable logic device. In other embodiments, the parser 202 and allocator 204 may be embodied as computer code stored in memory and executed through a processor. In some embodiments, the parser 202 and allocator 204 may be incorporated into a product of the assignee or as an add-on module to a product of the assignee.

Within a software development environment, the client request 212 may include instructions to compile selected software modules and produce a software build, as well as desired environment information in which to execute this request. The parser may extract the usage parameter information 214 and the request 216 from the client request 212 and pass these to the allocator 204. In this example the allocator may assign a particular set of software and hardware resources in accordance with the request. In some embodiments, the resources assigned would include a particular compiler that compiles the software modules and a software integrator that produces the build within the consolidated computing environment resources 210. After assigning the resources for the virtual environment, the allocator 204 passes parameters, the request, and any associated instructions from the request to the virtual environment. This allocated virtual environment executes the request 216 using this usage parameter information 214.

In another example, the consolidated computing environment may include beta and production versions of an application running on an operating system. A first request may be to execute a command in the beta version of the application. The parser 202 would receive the client request 212 and determine that the beta version should execute the request utilizing a particular set of resources including a specific application 206 "Application A" which is the beta version of the application in this example. These resources may include databases, e.g. of authorized users, and applications supporting the primary applications and libraries. A second request may be to execute a command in the production version of the application. Here, the parser 202 would receive this client request 212 and determine that the production version of the application should execute the request utilizing a particular set of resources including a specific application 208 "Application B" which is the production version of the application in this example. The allocator 204 may allocate some of the resources utilized in the virtual environment allocated for the first request to the virtual environment allocated for the second request. In some embodiments, the first and second requests may be received simultaneously.

In another example, the consolidated computing environment could implement multiple virtual environments. The multiple computing environments may include test environments such as BAT, BAT2, INT, INT2, STAGE and production environments such as BETA, EXT-INT, UAT, and PROD. These multiple virtual environments may share some resources within the consolidated computing environment.

Figure 3:
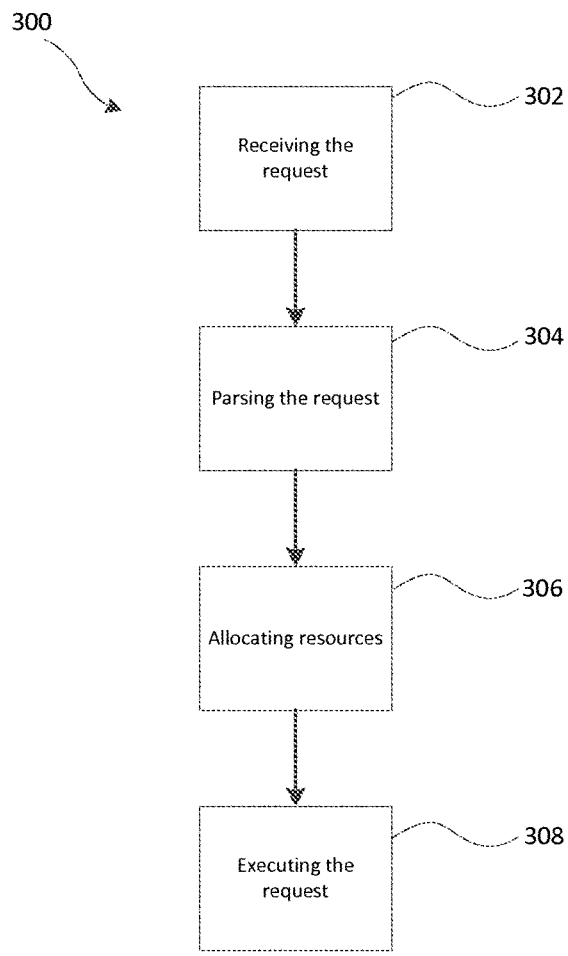
FIG. 3 shows a flow diagram depicting a consolidated computing environment processing a client request.

FIG. 3 illustrates a flow diagram 300 depicting a consolidated computing environment processing a client request. In an action 302 the request is received by the parser. The request may include a URL, header, URI, or other environment information. In an action 304 the request is parsed. The parsing includes extracting user parameter information from the request, such as environment information. In an action 306 an allocator allocates resources in accordance with the request. The allocator receives the usage parameter information from the parser and determines the resources needed to execute the request. In an action 308 the request is executed. The request is executed in the virtual environment as allocated by the allocator in action 306.

Figure 4:
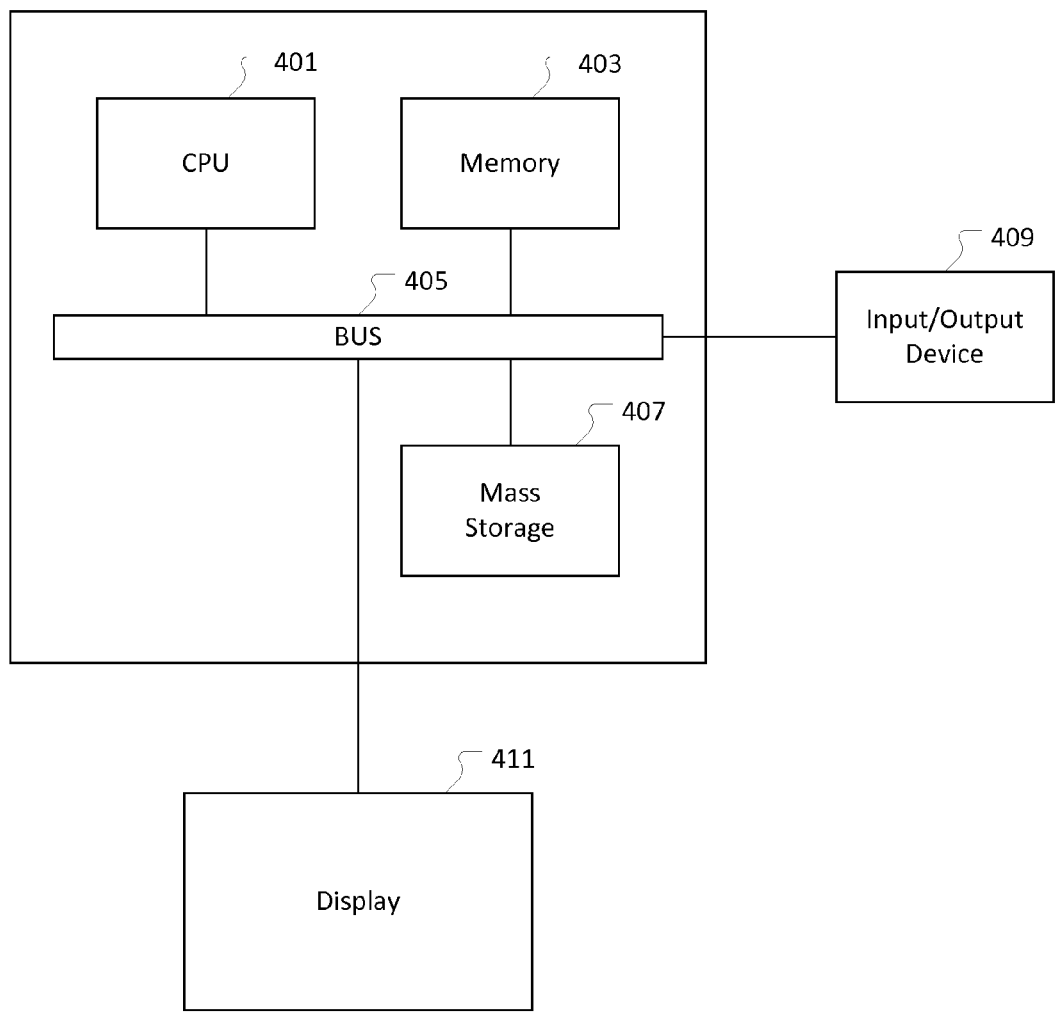
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for the processes in accordance with some embodiments. The computing device includes a central processing unit (CPU) 401, which is coupled through a bus 405 to a memory 403, and mass storage device 407. Mass storage device 407 represents a persistent data storage device such as a disc drive, which may be local or remote in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

With reference back to FIGS. 1-4, the consolidated computing environment, with parser and allocator, allows the consolidation of environments of a given distributed service while allowing the back end services and dependencies to remain dynamic. For example, a distributed service offered to multiple users of a cloud computing environment have back end services dynamically allocated on a per request basis. This mechanism allows the endpoint or service to utilize separate back end configurations, but with a single front end service. With regards to the previous example, the single front end service includes the parser, and the back end services include the allocator, the applications, the consolidated computing environment resources, and external resources. This configuration allows a reduction in resources formerly dedicated to distinct fixed environments, and allows one environment, i.e., the consolidated environment, to appear externally as if it were several environments. This reduction in environments reduces the total number of environments which leads to direct savings in infrastructure and time in working with environments. With consolidation of environments, unused servers can be decommissioned and maintenance needs for this consolidated environment is reduced in comparison to the maintenance requirements of multiple fixed environments. Consequently, the embodiments reduce infrastructure costs, with attendant reduction in personnel time and costs.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/ component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/ component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of dynamically servicing a client request, comprising:
    receiving a request within a consolidated computing environment, directed to a host having a hostname, the request having usage parameter information;
    parsing the usage parameter information from the request within the consolidated computing environment;
    parsing the hostname to determine an environment that is specific to the hostname and is one or more of: a beta environment, a production environment, a pre-production test environment, a development environment, or an integration environment;
    allocating resources contained within the consolidated computing environment according to the parsed usage parameter information and the one or more environments determined from parsing the hostname; and
    executing the request within the consolidated computing environment.

2. The method of claim 1 wherein the usage parameter information is contained in a Uniform Resource Locator (URL).
3. The method of claim 1 wherein the usage parameter information is contained in an HTTP header.
4. The method of claim 1 wherein the usage parameter information is contained in a Uniform Resource Identifier (URI).
5. The method of claim 1 wherein the allocated resources cooperate to form a virtual environment specific to the request.
6. The method of claim 1, wherein the consolidated computing environment appears as multiple distinct environments to a client.
7. The method of claim 1, wherein the consolidated environment resides on a server.
8. A method of allocating back-end resources of a consolidated computing environment in response to multiple client requests, comprising:
    receiving the multiple client requests within the consolidated computing environment, directed to multiple hostnames, the consolidated computing environment having access to resources applicable to specific environments;
    parsing usage parameter information from each of the multiple client requests;
    parsing each of the multiple hostnames to determine a computing environment specific to the hostname as one or more of: a beta environment, a production environment, a pre-production test environment, a development environment, or an integration environment;
    allocating back-end resources of the consolidated computing environment responsive to each of the multiple client requests, wherein the allocated resources combine to create the computing environment specific to each request and associated hostname;
    passing each of the client requests to respective allocated environments; and,
    executing each of the client requests within respective allocated environments.
9. The method of claim 8, wherein the consolidated computing environment receives the multiple client requests simultaneously and wherein the consolidated computing environment appears as multiple distinct environments to a client.
10. The method of claim 8, wherein the multiple client requests are received at a single front end service.
11. The method of claim 8, wherein a portion of the back-end resources allocated to an environment specific to a first request are re-allocated as back-end resources to an environment specific to a second request.
12. The method of claim 8, wherein the multiple allocated environments share back-end resources during the execution of their respective allocated environments.
13. The method of claim 8, wherein the allocated back-end resources for differing environments specific to differing requests include a shared application and differing hardware.
14. The method of claim 8, wherein the allocated back-end resources for differing environments specific to differing requests include shared hardware and differing applications.
15. The method of claim 8, wherein executing the multiple client requests occurs on an operating system shared across the multiple allocated environments.
16. A consolidated computing environment system comprising:
    a parser configured to receive a client request and determine usage parameter information from the client request and determine an environment specific to a hostname to which the request is directed, the environment based on the hostname and being at least one of: a beta environment, a production environment, a pre-production test environment, a development environment, or an integration environment;

an allocator configured to receive the usage parameter information and determined environment information from the parser and allocate back-end resources of the consolidated computing environment, wherein the allocated resources cooperate to form a virtual environment specific to the client request and the hostname and execute the request in the virtual environment.

17. The consolidated computing environment system of claim 16, wherein the virtual environment is based on a header of the client request.

18. The consolidated computing environment system of claim 16, wherein the parser and the allocator are included within a server.

19. The consolidated computing environment system of claim 18, wherein allocated back-end resources of the consolidated computing environment are external to the server.

20. The consolidated computing environment system of claim 16, wherein the parser is on a first server, and the allocator and at least a portion of back-end resources are located on a second server.

* * * * *